United States Patent
Jiang (10) Patent No.: US 6,725,040 B2
(45) Date of Patent: Apr. 20, 2004

(54) LOSSLESS SRNS RELOCATION PROCEDURE IN A WIRELESS COMMUNICATIONS SYSTEM

(75) Inventor: Sam Shiaw-Shiang Jiang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 275 days.

(21) Appl. No.: 09/682,006

(22) Filed: Jul. 9, 2001

(65) Prior Publication Data

US 2003/0008653 A1 Jan. 9, 2003

(51) Int. Cl.⁷ ............................................... H04Q 7/20
(52) U.S. Cl. ...................... 455/436; 455/438; 455/440; 455/442; 370/331
(58) Field of Search ................................ 455/436, 438, 455/440, 442, 443; 370/331, 332, 333, 334

(56) References Cited

U.S. PATENT DOCUMENTS

| | | |
|---|---|---|
| 2001/0007137 A1 | 7/2001 | Suumaki et al. |
| 2001/0017850 A1 * | 8/2001 | Kalliokulju et al. ........ 370/331 |
| 2002/0068565 A1 * | 6/2002 | Purnadi et al. ............. 455/436 |
| 2002/0072363 A1 * | 6/2002 | Riihinen et al. ............ 455/432 |

FOREIGN PATENT DOCUMENTS

WO          WO 01/60017 A1     8/2001

OTHER PUBLICATIONS

3GPP TS 25. 323 V3.4.0 (Mar. 2001).
3GPP, ETSI TS 123 060 V4.0.0 (Mar. 2001), Digital cellular telecommunications system (Phase 2t) (GSM); Universal Mobile Telecommunications System (UMTS); General Packet Radio Service (GPRS); Service description; stage z (3GPP TS 23.060 version 4.0.0 Release 4), pp. 73–84.

3GPP, ETSI TS 125 323 V4.0.0 (Mar. 2001), Universal Mobile Telecommunications System (UMTS); Packet Data Convergence Protocol (PDCP); Specification (3GPP TS 25.323 version 4.0.0 Release 4), pp. 1–19.

3GPP, ETSI TS 125 323 V4.3.0 (Dec. 2001), Universal Mobile Telecommunications System (UMTS); Packet Data Convergence Protocol (PDCP); specification (3GPP TS 25.323 version 4.3.0 Release 4), pp. 1–20.

* cited by examiner

Primary Examiner—Edward F. Urban
Assistant Examiner—Duy K Le
(74) Attorney, Agent, or Firm—Winston Hsu (57) ABSTRACT

Radio network subsystems (RNSs) are provided that are in communications with a core network (CN). One of the RNSs is an SRNS, and another RNS is a target RNS (TRNS). The SRNS is in wireless communications with a mobile unit to provide service data units (SDUs) from the CN to the mobile unit. The SRNS associates a sequence number (SN) with each of the SDUs, and the mobile unit is capable of confirming to the SRNS SDUs received from the SRNS. Forwarding information is provided by SRNS to the TRNS. The forwarding information includes SDUs unconfirmed as received by the mobile unit, a first SN that is the SN of the sequentially earliest unconfirmed SDU, and a second SN that is the SN of the sequentially last unconfirmed SDU actually transmitted to the mobile unit by the SRNS. Finally, the TRNS is made the new SRNS for the mobile unit.

7 Claims, 6 Drawing Sheets

LOSSLESS SRNS RELOCATION PROCEDURE IN A WIRELESS COMMUNICATIONS SYSTEM

BACKGROUND OF INVENTION

1. Field of the Invention

The present invention relates to a wireless communications network. In particular, the present invention discloses a method for performing lossless relocation of a serving radio network subsystem.

2. Description of the Prior Art

Figure 1:
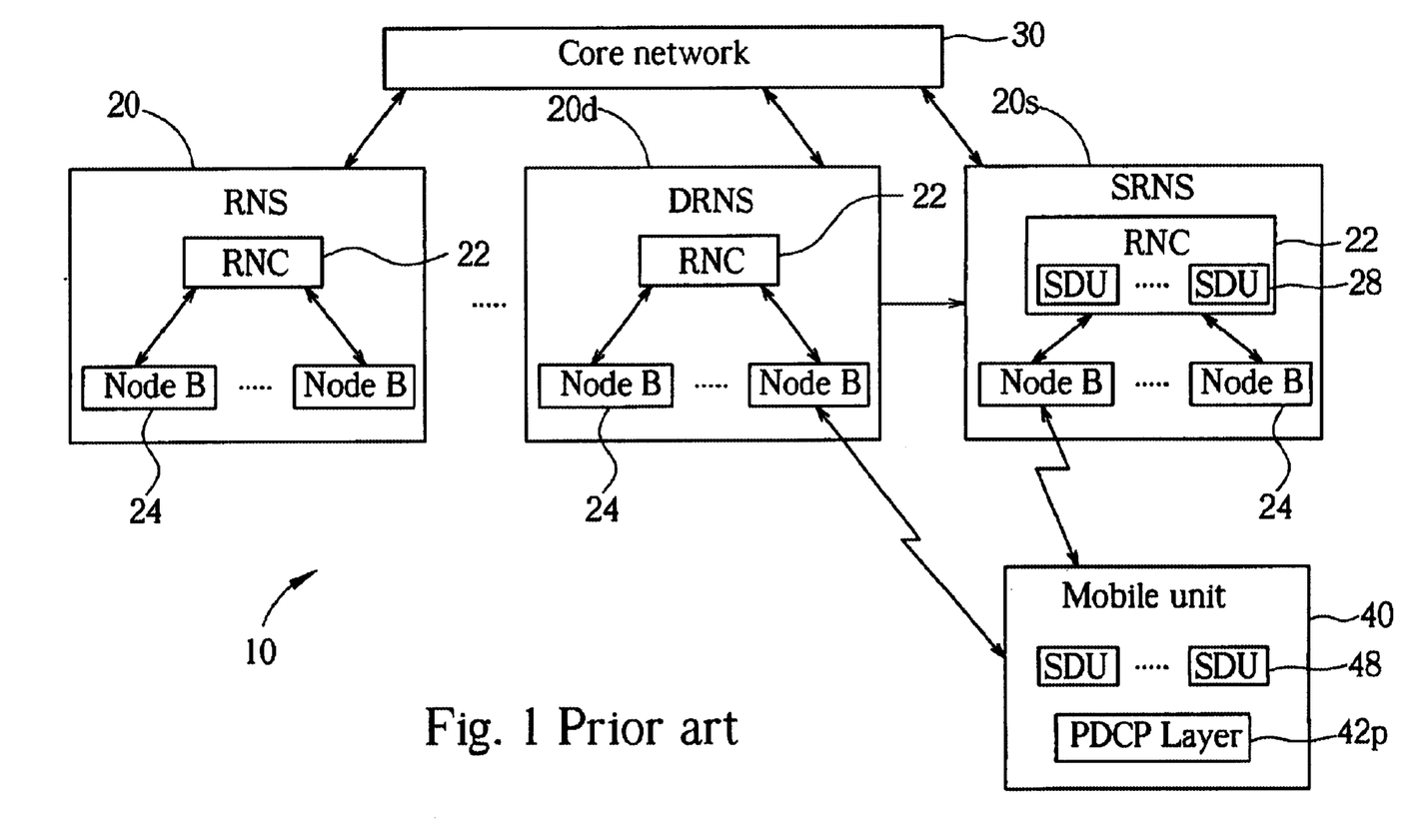
FIG. 1 is a block diagram of a wireless communications system.

Please refer to FIG. 1. FIG. 1 is a block diagram of a wireless communications network 10. The wireless communications network 10 comprises a plurality of radio network subsystems (RNSs) 20 in communications with a core network (CN) 30. Each RNS 20 comprises one radio network controller (RNC) 22 that is in communications with a plurality of node Bs 24. Each node B 24 is a transceiver, which is adapted to send and receive wireless signals. In particular, the wireless communications network 10 assigns a mobile unit 40 to a particular RNS 20, which is then termed the serving RNS (SRNS) 20s of the mobile unit 40. Data destined for the mobile unit 40 is sent by the CN 30 to the SRNS 20s. This data is in the form of service data units (SDUs) 28 that are held by the RNC 22 of the SRNS 20s pending transmittal by one of the Node Bs 24. The RNC 22 selects a node B 24 that is best able to accurately transmit the SDUs 28 to the mobile unit 40. Such a selection will depend, for example, upon the location of the mobile unit 40 within the domain of the SRNS 20s. The mobile unit 40 broadcasts SDUs 48 to the wireless communications network 10, which are then picked up by the SRNS 20s and forwarded to the CN 30. Occasionally, the mobile unit 40 may move close to the domain of another RNS 20, which is termed a drift RNS (DRNS) 20d. A node B 24 of the DRNS 20d may pick up one or more of the SDUs 48 transmitted by the mobile unit 40. The RNC 22 of the DRNS 20d forwards the received SDUs 48 to the SRNS 20s. The SRNS 20s then forwards these received SDUs 48 to the CN 30. Consequently, all communications between the mobile unit 40 and the CN 30 must pass through the SRNS 20s.

Figure 2:
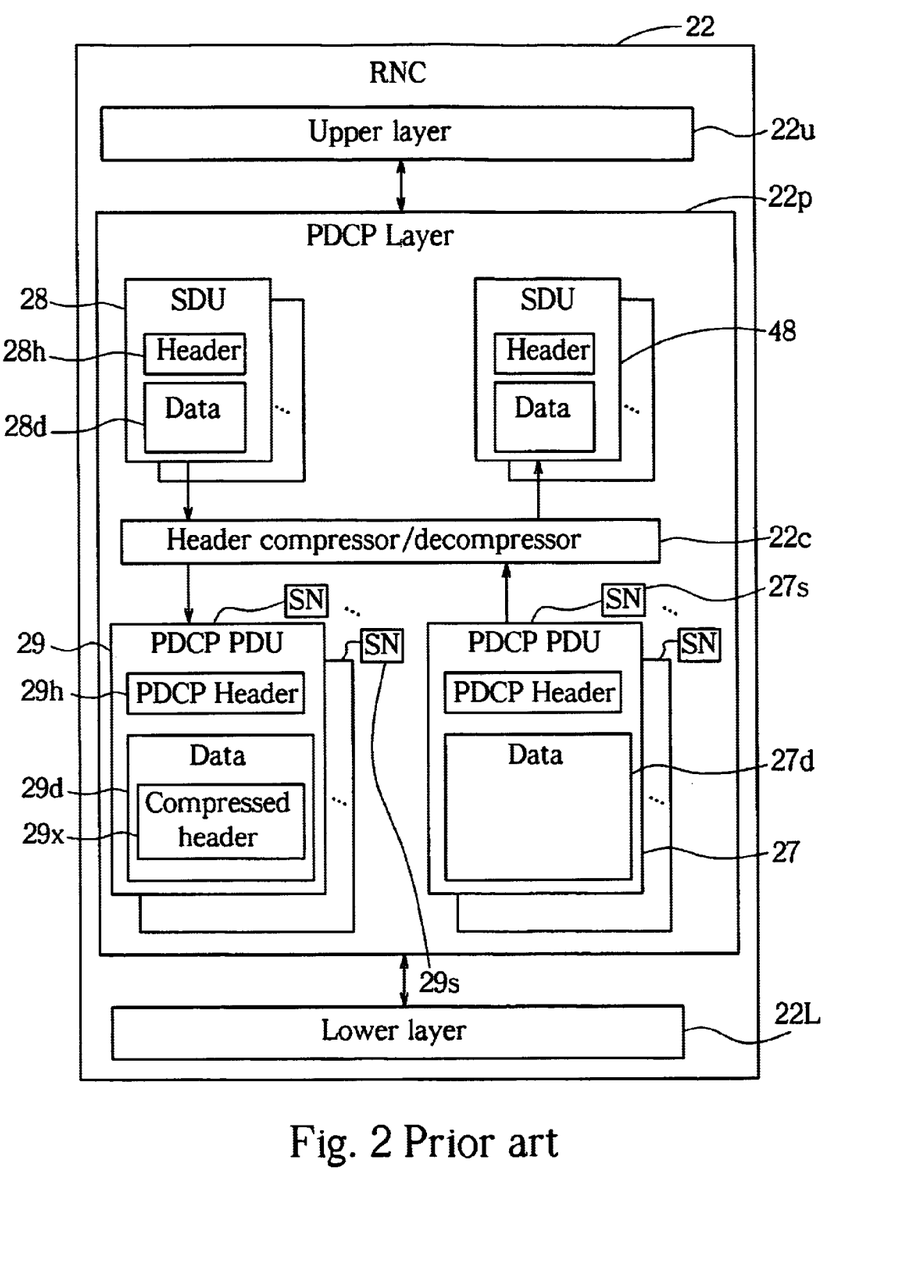
FIG. 2 is a block diagram of a radio network controller (RNC) of a serving radio network subsystem (SRNS) depicted in FIG. 1.

Please refer to FIG. 2 in conjunction with FIG. 1. FIG. 2 is a block diagram of the RNC 22 of the SRNS 20s. Communications between the mobile unit 40 and the RNC 22 are effected through a multi-layered communications protocol that has a packet data convergence protocol (PDCP) layer 22p in communications with an upper layer 22u and a lower layer 22L. The PDCP layer 22p receives a plurality of SDUs 28 from the upper layer 22u. Each SDU 28 includes a header 28h and data 28d. The primary purpose of the SDU 28 is to carry the data 28d to a destination indicated by the header 28h. The header 28h is analogous to an Internet protocol (IP) header. The header 28h may carry a lot of information that is redundant or repeated through the other SDU headers 28h in the other SDUs 28. One purpose of the PDCP layer 22p is to compresses the headers 28h so as to maximize bandwidth. This compression is performed by way of a header compressor/decompressor 22c. The header compressor/decompressor accepts an SDU 28 and generates a PDCP protocol data unit (PDCP PDU) 29. A PDCP PDU 29 includes a PDCP header 29h and data 29d. The data 29d includes compressed header data 29x that is generated by the header compressor/decompressor 22c according to the header 28h. Each PDCP PDU 29s is incrementally assigned a 16-bit sequence number (SN) 29s by the PDCP layer 22p. That is, each sequentially successive PDCP PDU 29 is assigned an incrementally higher SN 29s. For example, a first PDCP PDU 29 may be assigned an SN 29s of 62. A second PDCP PDU 29 immediately after the first PDCP PDU 29 would thus be assigned an SN 29s of 63, and so on. The SNs 29s are not actually a part of the PDCP PDUs 29, but are internally maintained by the PDCP layer 22p. The PDCP PDUs 29 are then delivered to the lower layer 22L for transmission. As there is a one-to-one correspondence between PDCP PDUs 29 and SDUs 28, and as each PDCP PDU 29 has an assigned SN 29s, each corresponding SDU 28 also has an associated SN 29s. That is, the SNs 29s are associated with both the PDCP PDUs 29 and the corresponding SDUs 28. Since bandwidth is to be maximized by the compression of the headers 28h, each PDCP PDU 29 should, ideally, be smaller in size than its corresponding SDU 28. To ensure that this is indeed the case, the PDCP header 29h should be kept as small as possible. The type of header compression used for the header compressor/decompressor 22c will depend upon the format of the headers 28h. As an example, though, if the headers 28h are IP headers, then the compression performed could conform to the IP industry standard RFC 2507.

Similarly, PDCP PDUs 27 received from the lower layer 22L (i.e., originating from the mobile unit 40) are fed into the header compressor/decompressor 22c to generate the corresponding SDUs 48. The SDUs 48 so generated are then delivered to the upper layer 22u. Each PDCP PDU 27 has a 16-bit SN 27s assigned to the PDCP PDU 27 by the PDCP layer 22p, in a manner that is analogous to the SNs 29s. These SNs 27s are also associated with the corresponding SDUs 48.

Figure 3:
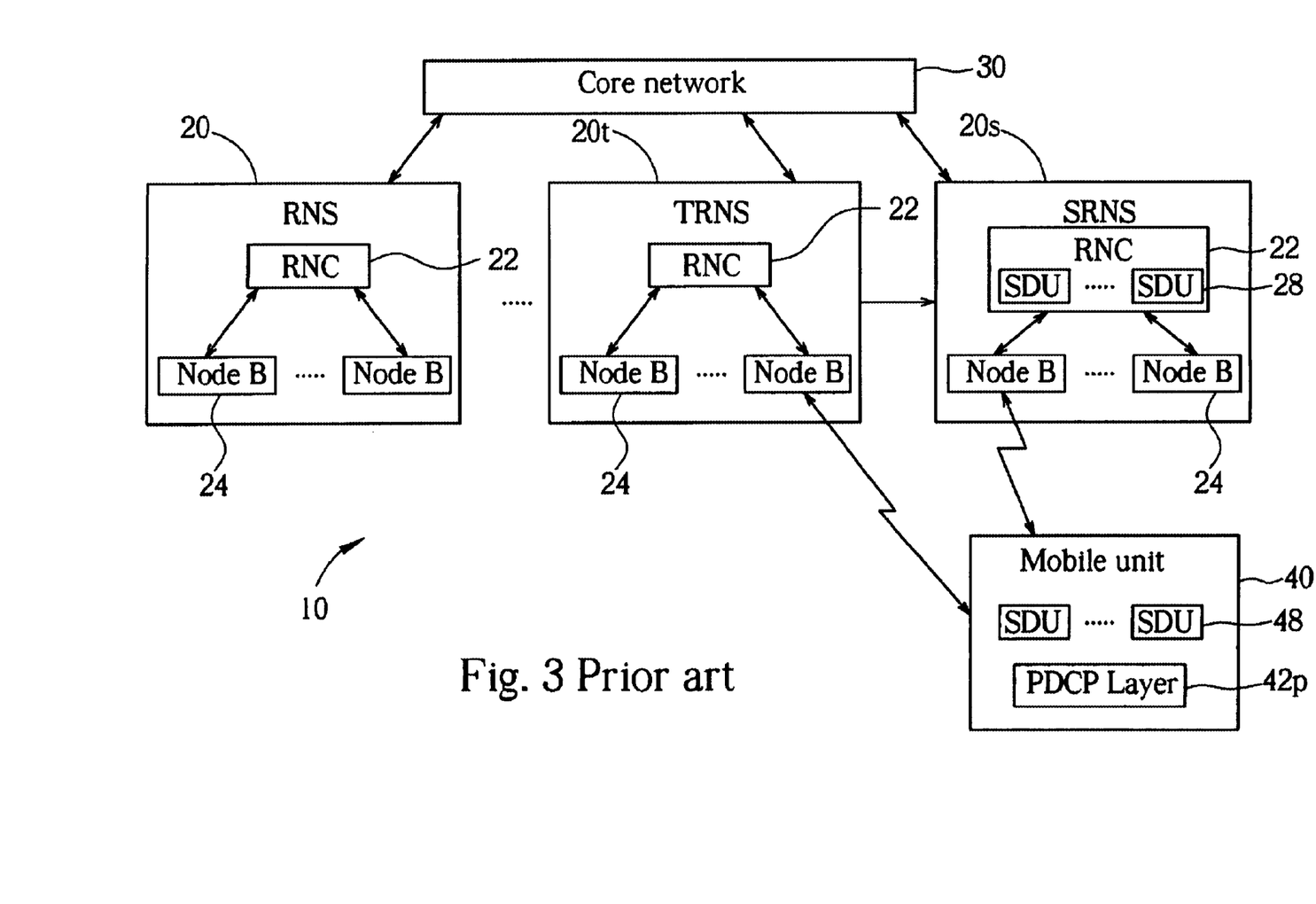
FIG. 3 is a block diagram of a mobile unit of FIG. 1 undergoing a lossless SRNS relocation procedure.
Figure 4:
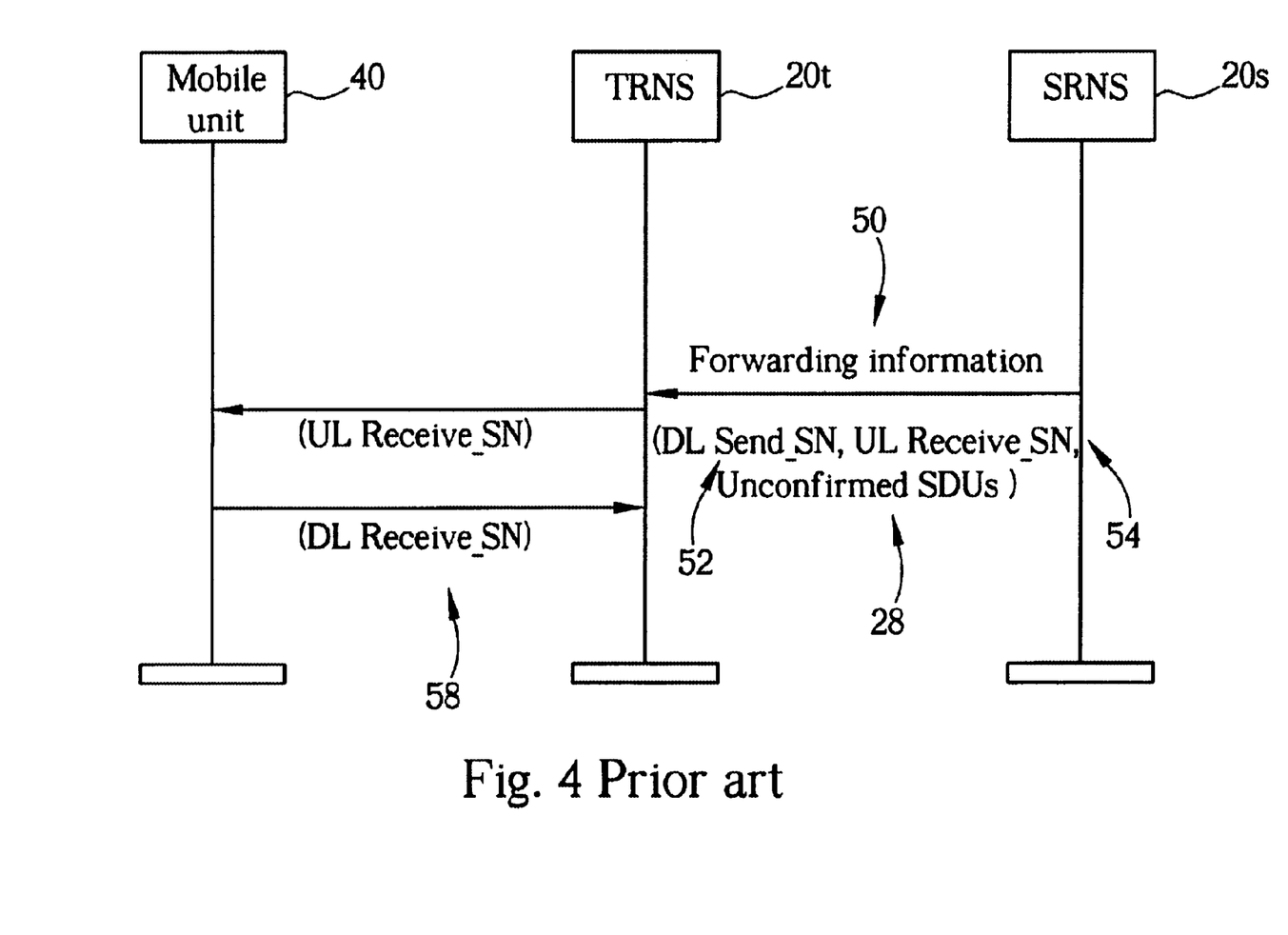
FIG. 4 is a message sequence chart for the prior art lossless SRNS relocation procedure.

As the mobile unit 40 moves closer towards the domain of the DRNS 20d, more and more SDUs 48 are received and forwarded by the DRNS 20d. Eventually, a decision is made by the wireless network 10 to place the mobile unit 40 under the DRNS 20d, and a transfer process is enacted. This process is termed a SRNS relocation procedure, and should be lossless. Lossless means that no SDUs 28, 48 are lost during the relocation procedure. Please refer to FIG. 3 in conjunction with FIGS. 1 and 2. FIG. 3 is a block diagram of the mobile unit 40 undergoing a lossless SRNS relocation procedure. The DRNS 20d becomes a target RNS (TRNS) 20t. After completion of the relocation procedure, the TRNS 20t will serve as the new SRNS 20s for the mobile unit 40. In order for the TRNS 20t to properly take up its job as the new SRNS 20s for the mobile unit 40, the current SRNS 20s must forward key information to the TRNS 20t. Please refer to FIG. 4 in conjunction with FIGS. 2 and 3. FIG. 4 is a message sequence chart for the prior art lossless SRNS relocation procedure. The SRNS 20s sends forwarding information 50 to the TRNS 20t. This forwarding information includes a downlink sending sequence number (DL Send_SN) 52, an uplink receiving sequence number (UL Receive_SN) 54, and all unconfirmed SDUs 28. The multi-layered communications protocol used by both the SRNS 20s and the mobile unit 40 enables the mobile unit 40 to confirm those PDCP PDUs 29 transmitted by the SRNS 20s that are successfully received by the mobile unit 40. Any PDCP PDUs 29 not explicitly confirmed as received by the mobile unit 40 are termed unconfirmed PDCP PDUs 29. As there is a one-to-one correspondence between SDUs 28 and PDCP PDUs 29, an unconfirmed PDCP PDU 29 means that there is a corresponding unconfirmed SDU 28. These unconfirmed SDUs 28 are forwarded by the SRNS 20s to the TRNS 20t. The DL Send_SN 52 is the value of the SN 29s associated with the sequentially earliest unconfirmed PDCP PDU 29. As the SNs 29s are not explicitly carried in the SDUs 28, this enables the TRNS 20t to properly associate an SN 29s for the corresponding PDCP PDU 29 of each forwarded SDU 28. The UL Receive_SN 54 is the value of the SN 27s associated with the PDCP PDU 27 that the SRNS 20s next expects to receive from the mobile unit 40. This enables the TRNS 20t to properly associate an SN 27s for each subsequently received PDCP PDU 27 from the mobile unit 40. The TRNS 20t sends the UL Receive SN 54 to the mobile unit 40. From this, the mobile unit 40 can determine which packets 48 to begin sending to the TRNS 20s under its guise as the new SRNS 20s. The mobile unit 40 sends a downlink receiving sequence number (DL Receive_SN) 58 to the TRNS. The DL Receive_SN 58 holds the value of the SN 29s of the next PDCP PDU 29 that the mobile unit 40 is expecting to receive from the TRNS 20t. From this, the TRNS 20t can learn which of the forwarded unconfirmed SDUs 28 to begin sending to the mobile unit 40. Consider, as an example, a situation in which the SRNS 20s has sent PDCP PDUs 29 to the mobile unit 40 having associated SNs 29s running from 0 to 99. We may further assume that, of these 100 PDCP PDUs 29 sent, only those with SNs 29s running from 0 to 50 were confirmed by the mobile unit 40. Consequently, there are unconfirmed PDCP PDUs 29 with SNs 29s running from 51 to 99, each of which has a corresponding unconfirmed SDU 28. Also, the SRNS 20s has received 200 PDCP PDUs 27 from the mobile unit 40, with SNs 27s running from 0 to 199. In the prior art SRNS relocation procedure, the SDUs 28 with associated SNs 29s running from 51 to 99 are forwarded by the SRNS 20s to the TRNS 20t. The DL Send_SN 52 would have a value of 51, and the UL Receive_SN 54 would have a value of 200. The DL Receive_SN 58 will hold a value that is between 51 and 100, depending on how many of the unconfirmed PDCP PDUs 29 were actually received by the mobile unit 40, but not yet confirmed. If, for example, the DL Receive_SN 58 holds a value of 90, then the TRNS 20t knows that it may discard the forwarded SDUs 28 that have associated SNs 29s that run from 51 to 89, and will begin transmitting those forwarded SDUs 28 with associated SNs 29s that are from 90 and above. Although it should not happen, it is possible that the DL Receive_SN 58 will either be sequentially before the DL Send_SN 52 or sequentially after the SN 29s associated with the sequentially last forwarded SDU 28. Such an occurrence means that the SNs 29s and/or 27s maintained by the RNC 22 of the SRNS 20s are out of synchronization with corresponding SNs maintained by the mobile unit 40. A re-synchronization procedure is thus enacted by the TRNS 20t. During the re-synchronization procedure, the TRNS 20t transmits PDCP PDUs 29 that explicitly contain their associated SNs 29s in their PDCP headers 29h, beginning with the PDCP PDU 29 corresponding with the sequentially earliest forwarded SDU 28. Once the mobile unit 40 has confirmed one of these PDCP PDUs 29, the TRNS 20t stops including the SNs 29s in the PDCP headers 29h. Including the SN 29s in the PDCP header 29h is not desired, as it increases the size of the PDCP header 29h, but it does enable the mobile phone to synchronize its internally maintained SNs with those of the SRNS 20s.

However, there may be times that a re-synchronization procedure should be performed that are not detectable by the prior art SRNS relocation procedure. As initial conditions, consider the case in which the SRNS 20s has 30 unconfirmed SDUs 28: the first 20 of these unconfirmed SDUs 28 have been transmitted, but not confirmed, while the last 10 have not yet been transmitted, and so could not possibly have been confirmed. During the SRNS relocation procedure, all 30 of these unconfirmed SDUs 28 are forwarded to the TRNS 20t. If it is assumed that the first of these unconfirmed SDUs 28 as an associated SN 29s of 101, then DL Send_SN 52 will have a value of 101. Four cases arise, depending upon the value of DL Receive_SN 58:

Case 1: DL Receive_SN 58 is less than 101. The re-synchronization procedure is performed, as the mobile unit 40 should not indicate that it is expecting to receive an SDU 28 that is sequentially before one that has already been confirmed by the mobile unit 40. All SDUs 28 are received and confirmed in sequential order.

Case 2: DL Receive_SN 58 is between 101 and 121. This is the typical case, and the mobile unit is confirming reception of some or all of the first 20 unconfirmed SDUs 28 that were transmitted by the SRNS 20s. No re-synchronization process is performed, so that no SNs 29s are explicitly sent in the PDCP PDUs 29 sent by the TRNS 20t.

Case 3: DL Receive_SN 58 exceeds 131. In this case, the mobile unit is indicating that it has already received SDUs 28 that the SRNS 20s never had, which were never forwarded, and so which could not possibly have been transmitted. Re-synchronization is performed. Finally, and most importantly, Case 4: DL Receive_SN 58 is between 122 and 131. In this case, a re-synchronization procedure should be performed, as the SRNS 20s never actually transmitted the SDUs 28 with associated SNs 29s between 122 and 131. However, the TRNS 20t has no way of knowing this, for insufficient information is provided by the SRNS 20s. This will lead to data loss, as the forwarded SDUs 28 that have associated SNs 29s before DL Receive_SN are discarded by the TRNS 20t.

SUMMARY OF INVENTION

It is therefore a primary objective of this invention to provide lossless relocation for a new serving radio network subsystem (SRNS) that can detect occurrences in which re-synchronization between the mobile unit and the SRNS needs to be performed to prevent loss of data.

Briefly summarized, the preferred embodiment of the present invention discloses a method for performing lossless relocation of a serving radio network subsystem (SRNS) in a wireless communications network. Radio network subsystems (RNSs) are provided that are in communications with a core network (CN). One of the RNSs is an SRNS, and another RNS is a target RNS (TRNS). The SRNS is in wireless communications with a mobile unit to provide service data units (SDUs) from the CN to the mobile unit. The SRNS associates a sequence number (SN) with each of the SDUs, and the mobile unit is capable of confirming to the SRNS SDUs received from the SRNS. Forwarding information is provided by SRNS to the TRNS. The forwarding information includes SDUs unconfirmed as received by the mobile unit, a first SN that is the SN of the sequentially last unconfirmed SDU actually transmitted to the mobile unit by the SRNS, and a second SN that is the SN of the sequentially earliest unconfirmed SDU. Finally, the TRNS is made the new SRNS for the mobile unit.

It is an advantage of the present invention that by providing the first SN, the TRNS can determine if the mobile unit is responding to the lossless SRNS procedure with an SN that is sequentially too far ahead, and thus more accurately determine when a re-synchronization process should be performed.

These and other objectives of the present invention will no doubt become obvious to those of ordinary skill in the art after reading the following detailed description of the preferred embodiment, which is illustrated in the various figures and drawings.

DETAILED DESCRIPTION

In the following description, a mobile unit may be a mobile telephone, a handheld transceiver, a base station, a personal data assistant (PDA), a computer, or any other device that requires a wireless exchange of data. It should be understood that many means may be used for the physical layer to effect wireless transmissions, and that any such means may be used for the system hereinafter disclosed.

Figure 5:
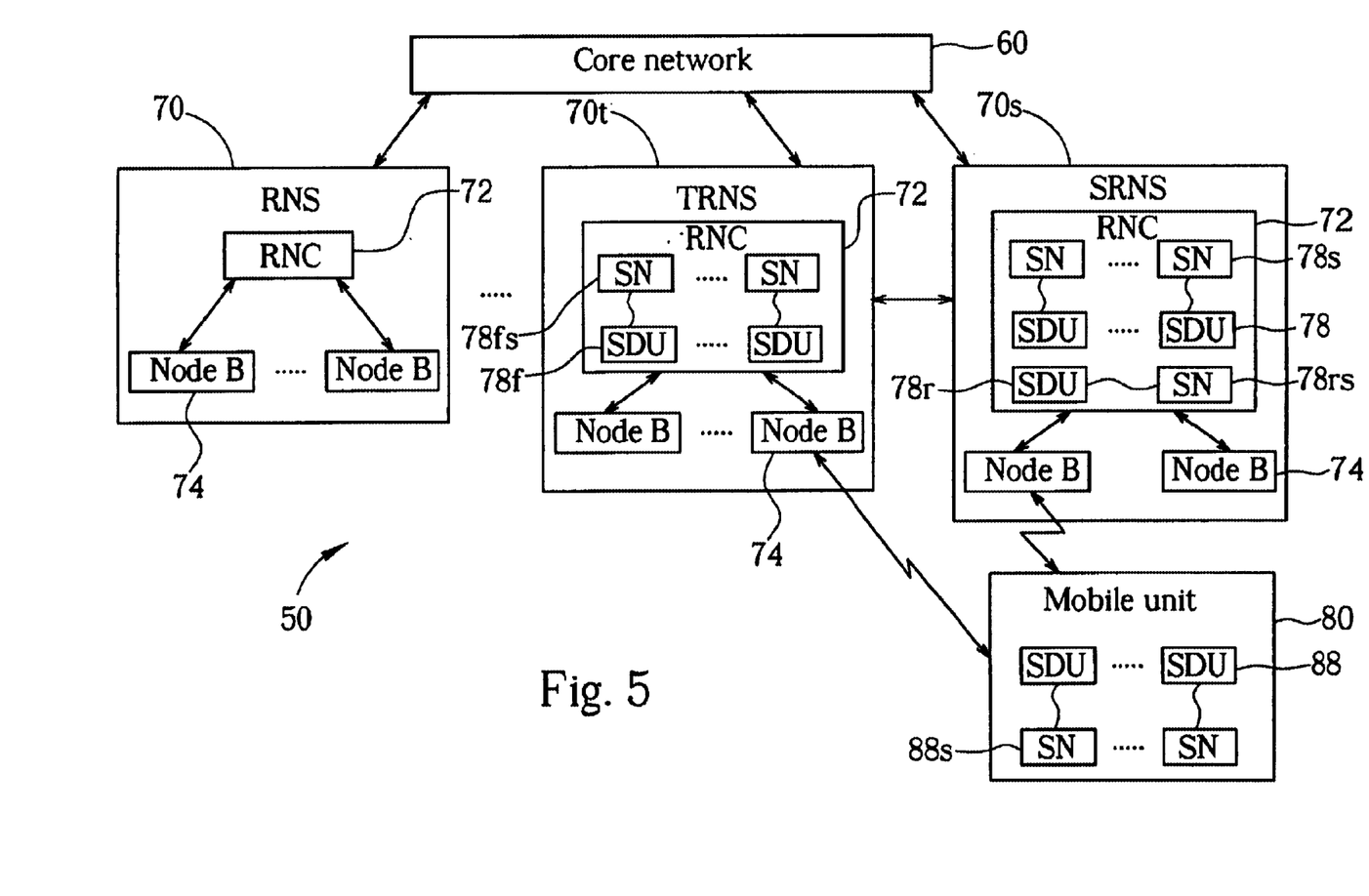
FIG. 5 is a block diagram of a wireless communications system according to the present invention method.

Please refer to FIG. 5. FIG. 5 is a block diagram of a wireless communications system 50 according to the present invention method. The wireless communications system 50 comprises a core network (CN) 60 in communications with a plurality of radio network subsystems (RNSs) 70. Each RNS 70 comprises one radio network controller (RNC) 72 in communications with a plurality of node Bs 74. Each node B 74 is a transceiver designed to send wireless signals to, and receive wireless signals from, a mobile unit 80. Each RNC 72 controls its respective node Bs 74 to most efficiently communicate with the mobile unit 80. In particular, the mobile unit 80 is assigned to a particular RNS 70, which is termed a serving RNS (SRNS) 70s. The mobile unit 80 sends and receives data to the CN 60 through the SRNS 70s. The SRNS 70s is thus the primary host of the mobile unit 80, acting as a data gateway for the mobile unit 80 to the CN 60.

Data is transmitted to the mobile unit 80 by the SRNS 70s in the form of service data units (SDUs) 78. Each SDU 78 has an associated 16-bit sequence number (SN) 78s, which is generated by the RNC 72 of the SRNS 70s. The SNs 78s are assigned to their respective SDUs 78 with values that indicate the sequential ordering of the SDUs 78. Thus, SDUs 78 that are sequentially early will tend to have associated SNs 78s that are less than those of sequentially later SDUs 78. In a similar manner, the mobile unit 80 assigns an SN 88s to each SDU 88 received from the SRNS 70s. For a transmitted SDU 78, the associated SN 78s should be identical to the SN 88s for the corresponding received SDU 88. This is termed synchronization between the SRNS 70s and the mobile unit 80. If it is determined that the SNs 78s and 88s are not properly synchronized with each other, then a re-synchronization procedure must be initiated.

The mobile unit 80 is able to inform the SRNS 70s that the mobile unit 80 has successfully received an SDU 88 corresponding to a transmitted SDU 78. This is termed confirming the SDU 78. SDUs 78 are confirmed in sequence. That is, the mobile unit 80 should not confirm that a sequentially later SDU 78 has been received before confirming all sequentially earlier intervening SDUs 78. Any SDU 78 that has not been explicitly confirmed by the mobile unit 80 is termed an unconfirmed SDU 78. Thus, not only are SDUs 78 termed unconfirmed that have been transmitted by the SRNS 70s and not confirmed as received by the mobile unit 80, but also any SDU 78 that has not yet been transmitted by the SRNS 70s is termed an unconfirmed SDU 78. Generally, the SN 78s is not carried by its associated SDU 78. However, during a re-synchronization procedure, the SNs 78s are explicitly carried by their respective SDUs 78. Upon receiving such an SDU 88, the mobile unit 80 uses the associated SN 78s embedded within the SDU 88 to set the associated SN 88s. The mobile unit 80 then confirms the corresponding SDU 78, which terminates the re-synchronization procedure.

Figure 6:
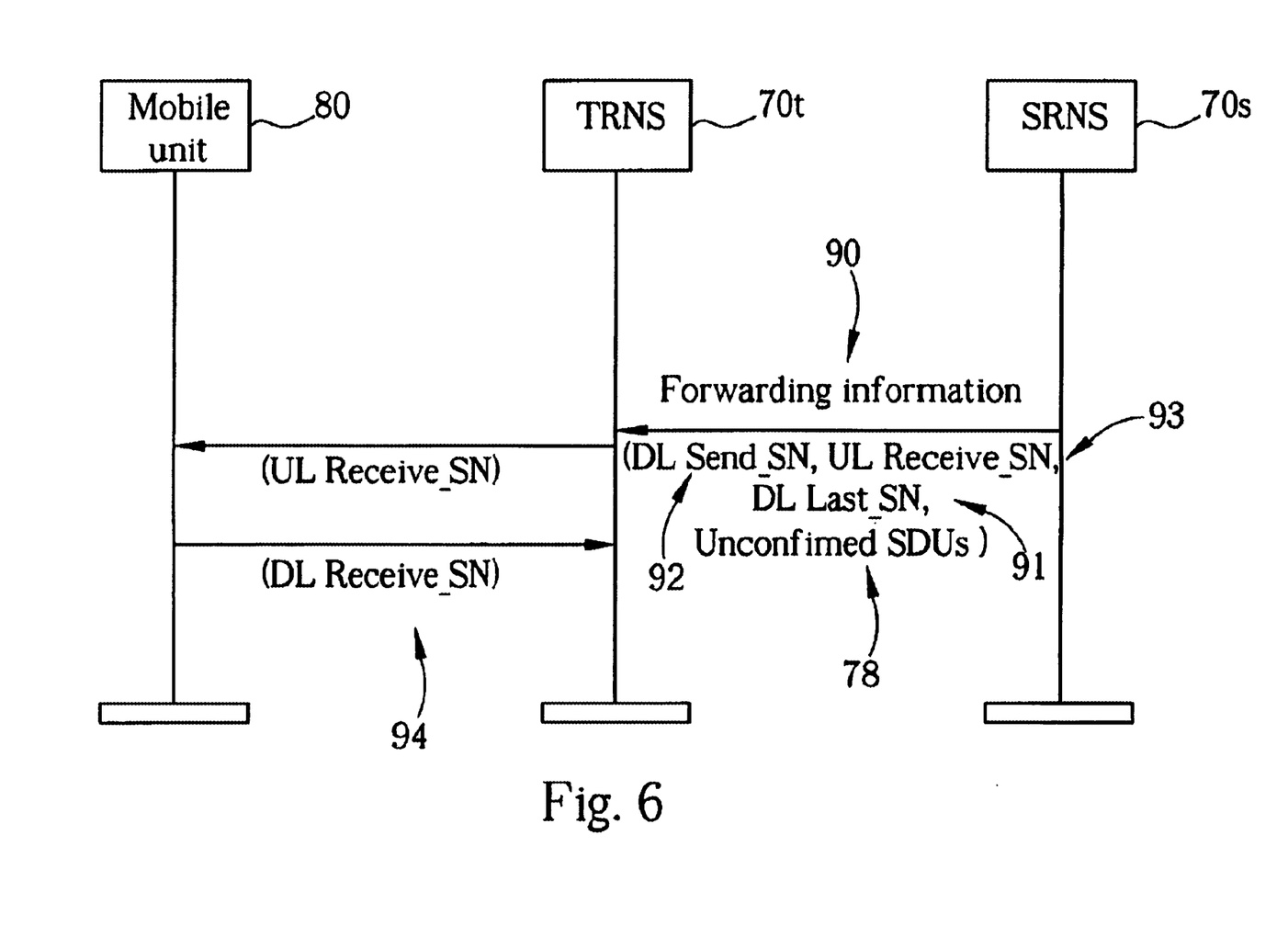
FIG. 6 is a message sequence chart for the present invention lossless SRNS relocation procedure.

As the mobile unit 80 roams out of the domain of the SRNS 70s, the mobile unit 80 will begin to move into the domain of another RNS 70. Eventually, a decision is made to allocate the mobile unit 80 to a new RNS 70, which is termed the target RNS (TRNS) 70t. A lossless relocation procedure is then performed, utilizing the SRNS 70s and the TRNS 70t, upon completion of which the TRNS 70t will serve as the new SRNS 70s for the mobile unit 80. Please refer to FIG. 6 with reference to FIG. 5. FIG. 6 is a message sequence chart for the present invention method for a lossless SRNS relocation procedure. To ensure that the TRNS 70t can properly assume its role as a new SRNS 70s for the mobile unit 80, the SRNS 70s sends forwarding information 90 to the TRNS 70t. The forwarding information 90 includes a first value 91 (hereinafter termed the first SN 91), a second value 92 (hereinafter termed the second SN 92), a third value 93 (hereinafter termed the third SN 93), and all unconfirmed SDUs 78, regardless of whether or not the unconfirmed SDUs 78 have actually been transmitted by the SRNS 70s. The TRNS 70t thereby acquires forwarded SDUs 78f from the forwarding information 90. The second SN 92 is a downlink sending sequence number (DL Send_SN) 92, and is the SN 78s associated with the sequentially earliest unconfirmed SDU 78 in the forwarding information 90. As the SNs 78s are not explicitly carried by the SDUs 78 in the forwarding information 90, the second SN 92 enables the TRNS 70t to properly associate an SN 78fs for each forwarded SDU 78f. Each SN 78fs should be identical to its corresponding SN 78s. The first SN 91 is a downlink last-sent sequence number (DL Last_SN) 91, and is the SN 78s associated with the sequentially earliest unconfirmed SDU 78 in the forwarding information 90 that has not been transmitted by the SRNS 70s. The first SN 91 thereby enables the TRNS 70t to differentiate forwarded SDUs 78f that have already been transmitted by the SRNS 70s from forwarded SDUs 78f that have not yet been transmitted by the SRNS 70s, and is a key point of the present invention method. The third SN 93 is an uplink received sequence number (UL Receive SN) 93, and is an SN 78rs associated by the SRNS 70s of an SDU 78r that the SRNS 70s next expects to receive from the mobile unit 80. The third SN 93 thereby enables the TRNS 70t to associate SNs with SDUs transmitted by the mobile unit 80. The TRNS 70t sends the third SN 93 to the mobile unit 80, enabling the mobile unit 80 to determine which SDUs to begin transmitting. The mobile unit 80 sends a fourth value 94 (hereinafter termed the fourth SN 94) to the TRNS 70t. The fourth SN 94 is a downlink received sequence number (DL Receive_SN) 94, and is the SN 88s associated by the mobile unit 80 for an SDU 88 that the mobile unit 80 next expects to receive from the TRNS 70*t*. The fourth SN 94 thus enables the TRNS 70*t* to determine from which forwarded SDU 78*f* the TRNS 70*t* should begin transmitting the forwarded SDUs 78*f*. Forwarded SDUs 78*f* that are sequentially before the fourth SN 94 are discarded by the TRNS 70*t* under the assumption that they have already been received by the mobile unit 80. With the forwarding information 90, and the fourth SN 94, the TRNS 70*t* has all of the information needed to assume the role of the new SRNS 70*s*. Consequently, the mobile unit 80 is transferred to the TRNS 70*t*, and the TRNS 70*t* becomes the new SRNS 70*s* for the mobile unit 80.

By providing the first SN 91 in the forwarding information 90, the present invention method enables the TRNS 70*t* to detect a loss of synchronization between the SNs 88*s* and the corresponding SNs 78*fs*, and initiate a re-synchronization procedure as needed. Consider the example presented previously. As initial conditions, it is again assumed that the SRNS 70*s* has 30 unconfirmed SDUs 78: the first 20 of these unconfirmed SDUs 78 have been transmitted, but not confirmed, while the last 10 have not yet been transmitted. During the SRNS relocation procedure, all 30 of these unconfirmed SDUs 78 are forwarded to the TRNS 70*t*, to provide the corresponding forwarded SDUs 78*f*. Assuming that the first of these unconfirmed SDUs 78 has an associated SN 78*s* of 101, then the second SN 92 in the forwarding information 90 will have a value of 101. The first SN 91 will thus have a value of 121, as 20 of the forwarded SDUs 78*f* have already been transmitted by the SRNS 70*s*. The third SN 93 will have a value based upon the SN 78*rs* of the SDU 78*r* that the SRNS 78*s* was next expecting to receive from the mobile unit 80. If, for example, the SRNS 70*s* received 100 SDUs 78*r* from the mobile unit 80 with associated SNs 78*rs* from zero to 99, then the third SN 93 would be 100. Again, four cases arise, depending upon the value of the fourth SN 94:

Case 1: The fourth SN 94 is less than 101. The re-synchronization procedure is performed, as the mobile unit 80 should not indicate that it is expecting to receive an SDU 88 that is sequentially before one that has already been confirmed. All forwarded SDUs 78*f* are thus transmitted to the mobile unit 80.

Case 2: The fourth SN 94 is between 101 and 121, inclusively. This is the typical case, and the mobile unit is confirming reception of some or all of the first 20 unconfirmed SDUs 78 that were transmitted by the SRNS 70*s*. No re-synchronization process is performed, so that no SNs 78*fs* are explicitly transmitted in the SDUs 78*f* by the TRNS 70*t*. The TRNS 70*t* begins transmitting from the SDU 78*f* having an associated SN 78*fs* that equals the fourth SN 94. All other sequentially earlier forwarded SDUs 78*f* are discarded.

Case 3: The fourth SN 94 exceeds 131. In this case, the mobile unit 80 is indicating that it has already received SDUs 88 that the SRNS 70*s* never had. Re-synchronization is performed, and all forwarded SDUs 78*f* are transmitted by the TRNS 70*t*. Finally, Case 4: The fourth SN 94 is between 122 and 131, inclusively. The re-synchronization procedure is performed, as the fourth SN 94 exceeds the first SN 91, and the TRNS 70*t* thus knows that the SRNS 70*s* never actually transmitted the forwarded SDUs 78*f* that have associated SNs 78*fs* between 121 and 131, some of which the mobile unit 80 is erroneously confirming. All forwarded SDUs 78*f* are transmitted by the TRNS 70*t* to the mobile unit 80.

Although the first value 91 (i.e., the first SN 91) has been disclosed above as being the actual SN 78*s* of the sequentially earliest SDU 78 in the forwarding information 90 that was not transmitted by the SRNS 70*s*, it should be clear that other encoding methods are possible. For example, the first value 91 may be made to be the SN 78*s* of the sequentially last SDU 78 in the forwarding information 90 that was transmitted by the SRNS 70*s*. It may also be possible to use sequence number values from lower layers as the first value 91. Regardless of the encoding method used, the first value 91 should enable the TRNS 70*t* to differentiate SDUs 78*f* that have been transmitted by the SRNS 70*s* from those that have not, which is the key point of the present invention method. The same can be said for the second, third and fourth values 92, 93 and 94, respectively.

In contrast to the prior art, the present invention provides a first value 91 in the forwarding information 90. This first value 91 enables the TRNS 70*t* to differentiate forwarded SDUs 78*f* that have already been transmitted from those that have not, and thereby detect synchronization problems that might otherwise be missed. A truly lossless SRNS relocation procedure is thus more properly assured.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing lossless relocation of a serving radio network subsystem (SRNS) in a wireless communications system, the method comprising:

providing a plurality of radio network subsystems (RNSs) in communications with a core network (CN), wherein one of the RNSs is an SRNS, and another RNS is a target RNS (TRNS), the SRNS in wireless communications with a mobile unit to provide service data units (SDUs) from the CN to the mobile unit, the SRNS associating a sequence number (SN) with each of the SDUs, and the mobile unit capable of confirming to the SRNS SDUs received from the SRNS;

providing forwarding information from the SRNS to the TRNS, the forwarding information comprising:
SDUs from the SRNS; and
a first value enabling the TRNS to determine the SN associated with a sequentially first unconfirmed SDU in the forwarding information that has not been transmitted to the mobile unit by the SRNS; and making the TRNS a new SRNS for the mobile unit.

2. The method of claim 1 wherein the forwarding information contains all unconfirmed SDUs.

3. The method of claim 2 wherein the forwarding information further comprises a second value enabling the TRNS to determine the SN associated with the sequentially earliest unconfirmed SDU in the forwarding information.

4. The method of claim 3 wherein the forwarding information further comprises a third value associated by the SRNS for an SDU that is next expected to be received from the mobile unit.

5. The method of claim 4 further comprising the mobile unit providing a fourth value to the TRNS, the fourth value indicating an SN associated by the mobile unit of an SDU that is next to be received by the mobile unit; wherein if the fourth value is sequentially before the SN associated with the sequentially earliest unconfirmed SDU in the forwarding information, or is sequentially after the SN associated with the sequentially first unconfirmed SDU in the forwarding information that has not been transmitted to the mobile unit by the SRNS, then a re-synchronization procedure is performed.

6. The method of claim 1 wherein the first value is the SN associated with the sequentially first unconfirmed SDU in the forwarding information that has not been transmitted to the mobile unit by the SRNS.

7. The method of claim 1 wherein the first value is the SN associated with the sequentially last unconfirmed SDU in the forwarding information that has been transmitted to the mobile unit by the SRNS.

* * * * *